L. RAKAI.
ANTISKIDDING DEVICE FOR TIRES.
APPLICATION FILED MAY 6, 1914.
1,115,105.
Patented Oct. 27, 1914.
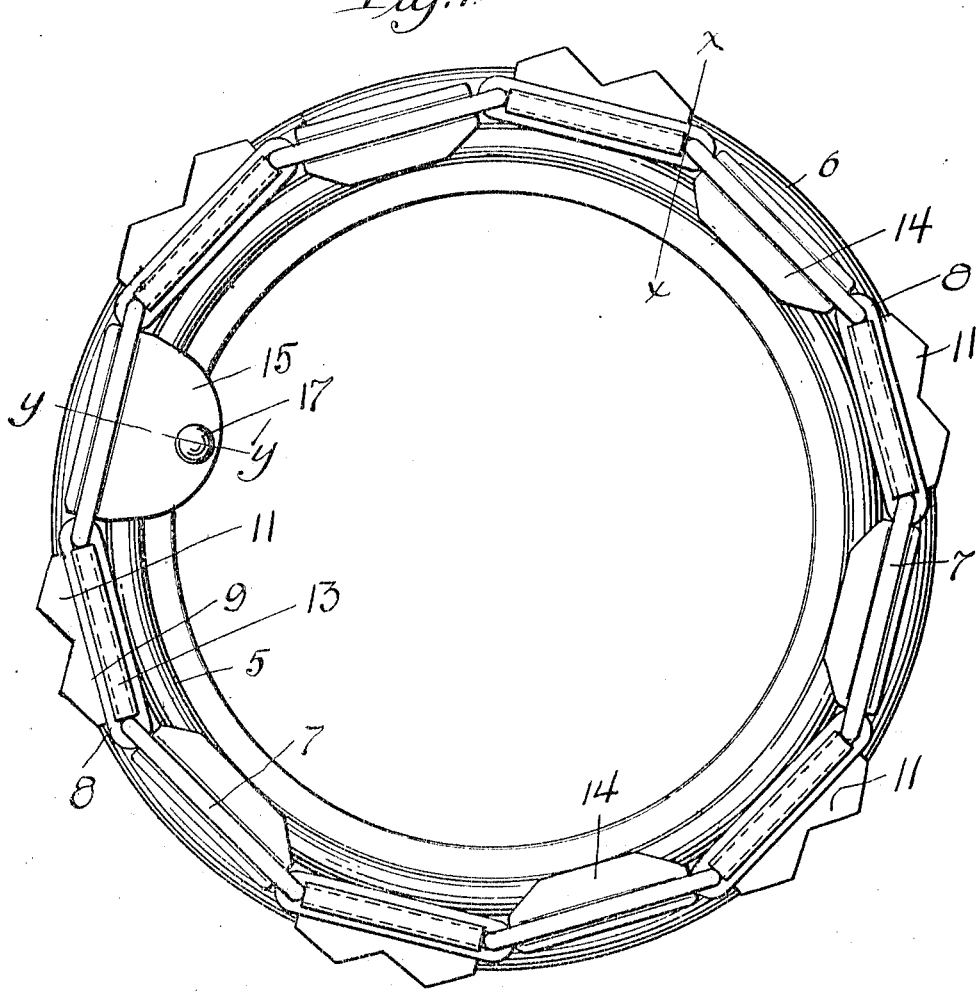
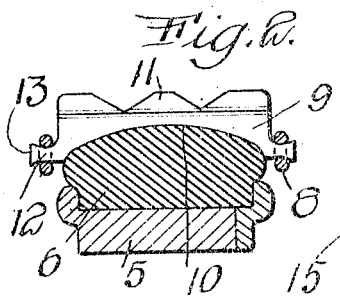
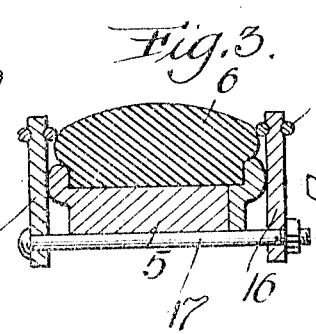
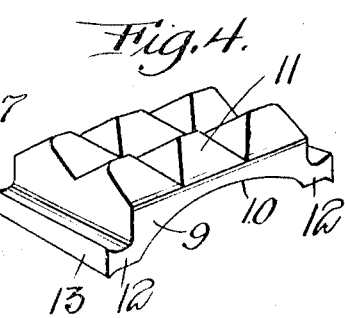
WITNESSES
INVENTOR
L. Rakai.
ATTORNEY

UNITED STATES PATENT OFFICE.

LAJOS RAKAI, OF BROUGHTON, PENNSYLVANIA.

ANTISKIDDING DEVICE FOR TIRES.

1,115,105.  Specification of Letters Patent.  Patented Oct. 27, 1914.

Application filed May 6, 1914. Serial No. 836,830.

*To all whom it may concern:*

Be it known that I, LAJOS RAKAI, a subject of the King of Hungary, residing at Broughton, in the county of Allegheny and State of Pennsylvania, have invented certain new and useful Improvements in Antiskidding Devices for Tires, of which the following is a specification, reference being had therein to the accompanying drawing.

This invention relates to antiskidding device for tires, and has for its object to provide a device of such class, in a manner as hereinafter set forth, capable of being conveniently positioned upon the tread of a tire and when so positioned reducing skidding to a minimum during the travel of a wheel.

Further objects of the invention are to provide an antiskidding device for tires, which is simple in its construction and arrangement and provided with means to prevent lateral shifting thereof, strong, durable, efficient and convenient in its use, readily set up and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views: Figure 1 is a side elevation of a tire showing the adaptation therewith of an antiskidding device therefor, in accordance with this invention, Fig. 2 is a section on line X—X Fig. 1, Fig. 3 is a section on line Y—Y Fig. 1, and Fig. 4 is a perspective view of one of the antiskidding members.

Referring to the drawings in detail, 5 denotes a rim and 6 a tire, which may be of any suitable form and mounted upon the tire and secured to the rim is an antiskidding device for the tire in accordance with this invention.

The antiskidding device comprises a pair of chains and each of the chains is constructed of two sets of links, the links of one set being indicated at 7 and the links of the other set at 8. The links 7 are alternately disposed with respect to the links 8, and connected thereto. The openings formed by the links 7 are disposed at an angle with respect to the openings formed by the links 8, that is to say the openings through the links 7 extend vertically while the openings through the links 8 are disposed at right angles thereto. The links 8 of the pair of chains oppose each other and the links 7 of the pair of chains oppose each other and connected to the opposing links 8 are antiskidding members comprising a body portion 9 having a convex inner face 10 and a toothed outer face 11. Each of the body portions 10 have lateral extensions 12, which project through the openings formed by the opposing links 8, and by such an arrangement the antiskidding members are connected to the pair of chains and are disposed transversely with respect to the tire 6. The convex inner face of the antiskidding members conforms in contour to the tread of the tire 6. The free ends of the extensions 12 are enlarged as at 13, under such conditions the antiskidding members are secured to the opposing links 8.

Extending through the openings formed by opposing links 7, are retaining members 14 which engage the sides of the rim 5, and which prevent lateral movement of the pair of chains. Two of the retaining members are of greater width than the other retaining members and the said retaining members of greater width are indicated at 15 and 16, and which project beyond the inner face of the rim 5, as clearly illustrated in Figs. 1 and 2, and the said retaining members 15 and 16 are connected together by a transverse bolt 17, which latter bears against the inner face of the rim 5. The retaining members are disposed at right angles with respect to the antiskidding members and such arrangement is had in view of the manner in which the links 7 are positioned with respect to the links 8.

What I claim is:

1. An anti-skidding device comprising a pair of chains adapted to be positioned at the sides of a tire, each of said chains consisting of two sets of links, the links of one set being alternately disposed with respect to the links of the other set, and the openings formed by the links of one set being disposed vertically of the openings formed by the links of the other set, anti-skidding members adapted to be mounted upon the tread of the tire and having extensions connected to those links having the openings disposed at right angles thereto, and retaining members adapted to be positioned at the sides of the tire and connected to those links having the openings thereof disposed vertically.

2. An anti-skidding device comprising a pair of chains adapted to be positioned at the sides of a tire, each of said chains consisting of two sets of links, the links of one set being alternately disposed with respect to the links of the other set and the openings formed by the links of one set being disposed vertically of the openings formed by the links of the other set, anti-skidding members adapted to be mounted upon the tread of the tire and having extensions connected to those links having the openings disposed at right angles thereto, retaining members adapted to be positioned at the sides of the tire and connected to those links having the openings thereof disposed vertically, a pair of said retaining members being of greater width than the other of said retaining members, and means for connecting the said pair of retaining members of greater width together.

3. An anti-skidding device comprising a pair of chains adapted to be positioned at the sides of a tire and each formed of elongated links, the links of one chain arranged parallel to the links of the other chain, anti-skidding members connected to certain of the links of said chains and adapted to extend transversely of a tire, retaining members connected to the other links of the chains and adapted to be positioned at the sides of the tire, said anti-skidding members alternately disposed with respect to said retaining members, and means for connecting a pair of said retaining members together.

In testimony whereof I affix my signature in the presence of two witnesses.

LAJOS RAKAI.

Witnesses:
  Mike Patkó,
  Luj Rennät.